US010705952B2

(12) United States Patent
Kanaujia et al.

(10) Patent No.: US 10,705,952 B2
(45) Date of Patent: Jul. 7, 2020

(54) USER SPACE DATA STORAGE MANAGEMENT

(71) Applicant: SanDisk Technologies LLC, Plano, TX (US)

(72) Inventors: Vishal Kanaujia, Bangalore (IN); Ramesh Chander, Bangalore (IN); Manavalan Krishnan, Fremont, CA (US); Brian W. O'Krafka, Austin, TX (US); Johann George, Sunnyvale, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 410 days.

(21) Appl. No.: 15/157,371

(22) Filed: May 17, 2016

(65) Prior Publication Data

US 2017/0123971 A1 May 4, 2017

Related U.S. Application Data

(60) Provisional application No. 62/250,839, filed on Nov. 4, 2015.

(51) Int. Cl.
*G06F 12/02* (2006.01)
*G06F 12/10* (2016.01)

(52) U.S. Cl.
CPC .......... *G06F 12/0246* (2013.01); *G06F 12/10* (2013.01); *G06F 2212/7201* (2013.01)

(58) Field of Classification Search
None
See application file for complete search history.

(56) References Cited

U.S. PATENT DOCUMENTS 5,659,798 A * 8/1997 Blumrich .............. G06F 13/28
710/22
7,290,114 B2 * 10/2007 Stillwell, Jr. ......... G06F 12/109
711/203

(Continued)

OTHER PUBLICATIONS

Welsh et al. "Incorporating memory management into user-level network interfaces". Mar. 1997. p. 1-10. Cornell University. Website: <https://ecommons.cornell.edu/handle/1813/7275>. (Year: 1997).*

(Continued)

*Primary Examiner* — Reginald G Bragdon
*Assistant Examiner* — James J. Thomas
(74) *Attorney, Agent, or Firm* — Loza & Loza, LLP; Gabriel Fitch

(57) ABSTRACT

Systems, methods, and/or devices are used to store metadata in a storage system. In one aspect, a first user space module sends a logical memory request to a memory management module of a kernel space module. The logical memory request includes data and metadata. A second user space module obtains the metadata of the logical memory request. A storage engine of the second user space module determines, in accordance with the obtained metadata, a location in non-volatile memory for the data. A second user space module generates a physical memory request including an indication of the non-volatile memory for the data. The second user space module transmits the physical memory request to the kernel space memory management module.

20 Claims, 6 Drawing Sheets

(56) References Cited

U.S. PATENT DOCUMENTS

| | | | |
|---|---|---|---|
| 7,603,484 B2* | 10/2009 | Dai | G06F 9/4413 |
| | | | 710/5 |
| 2011/0099325 A1 | 4/2011 | Roh et al. | |
| 2011/0219208 A1* | 9/2011 | Asaad | G06F 15/76 |
| | | | 712/12 |
| 2012/0110249 A1 | 5/2012 | Jeong et al. | |
| 2013/0046920 A1 | 2/2013 | Ryu et al. | |
| 2014/0208004 A1 | 7/2014 | Cohen et al. | |
| 2014/0281121 A1* | 9/2014 | Karamcheti | G06F 3/061 |
| | | | 711/102 |
| 2014/0379959 A1 | 12/2014 | Canepa et al. | |
| 2015/0138884 A1 | 5/2015 | Park | |
| 2017/0013015 A1* | 1/2017 | Dinha | H04L 63/0272 |

OTHER PUBLICATIONS

Gupta et al., "DFTL: A Flash Translation Layer Employing Demand-based Selective Caching of Pie-level Address Mappings", ASPLOS'09, Mar. 2009, 12 pages.

Wei et al., "WAFTL: A Workload Adaptive Flash Translation Layer with Data Partition", IEEE 2011, 12 pages.

* cited by examiner

USER SPACE DATA STORAGE MANAGEMENT

RELATED APPLICATIONS

This application claims priority to U.S. Provisional Patent Application No. 62/250,839, filed Nov. 4, 2015, which is hereby incorporated by reference in its entirety.

TECHNICAL FIELD

The disclosed embodiments relate generally to memory systems, and in particular, to passing memory request information between user space and kernel space.

BACKGROUND

The speed of many computer operations is frequently constrained by the speed and efficiency with which data can be stored and retrieved from memory. Many computing systems run operating systems that divide memory into kernel space, for managing operating system functions, and user space, for managing application software. When a storage engine for memory management is implemented in user space, the user space storage engine typically must communicate with a memory management system in kernel space to carry out memory operations. As a result of communications between the user space storage engine and memory management in kernel space, multiple copies of data contained in a memory request may be made as the memory request travels from user space to kernel space and from kernel space to user space. For example, I/O operations performed using a user space memory management system such as Filesystem in Userspace (FUSE) involve copying data (e.g., data to be stored in memory) from user space to kernel space, copying the data from a kernel component of FUSE to a user space storage engine of FUSE, and copying the data from user space to kernel space so that a driver of the kernel can perform I/O on a physical memory device. Reduction in the copying of data between user space and kernel space is desirable for more efficient memory operations.

SUMMARY

Without limiting the scope of the appended claims, after considering this disclosure, and particularly after considering the section entitled "Detailed Description," one will understand how the aspects of various embodiments are used to adjust error metrics for a memory portion of non-volatile memory in a storage device. In particular, a first user space module sends a logical memory request to a memory management module of a kernel space module. The logical memory request includes data and metadata. A second user space module obtains the metadata of the logical memory request. A storage engine of the second user space module determines, in accordance with the obtained metadata, a location in non-volatile memory for the data. A second user space module generates a physical memory request including an indication of the non-volatile memory for the data. The second user space module transmits the physical memory request to the kernel space memory management module.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
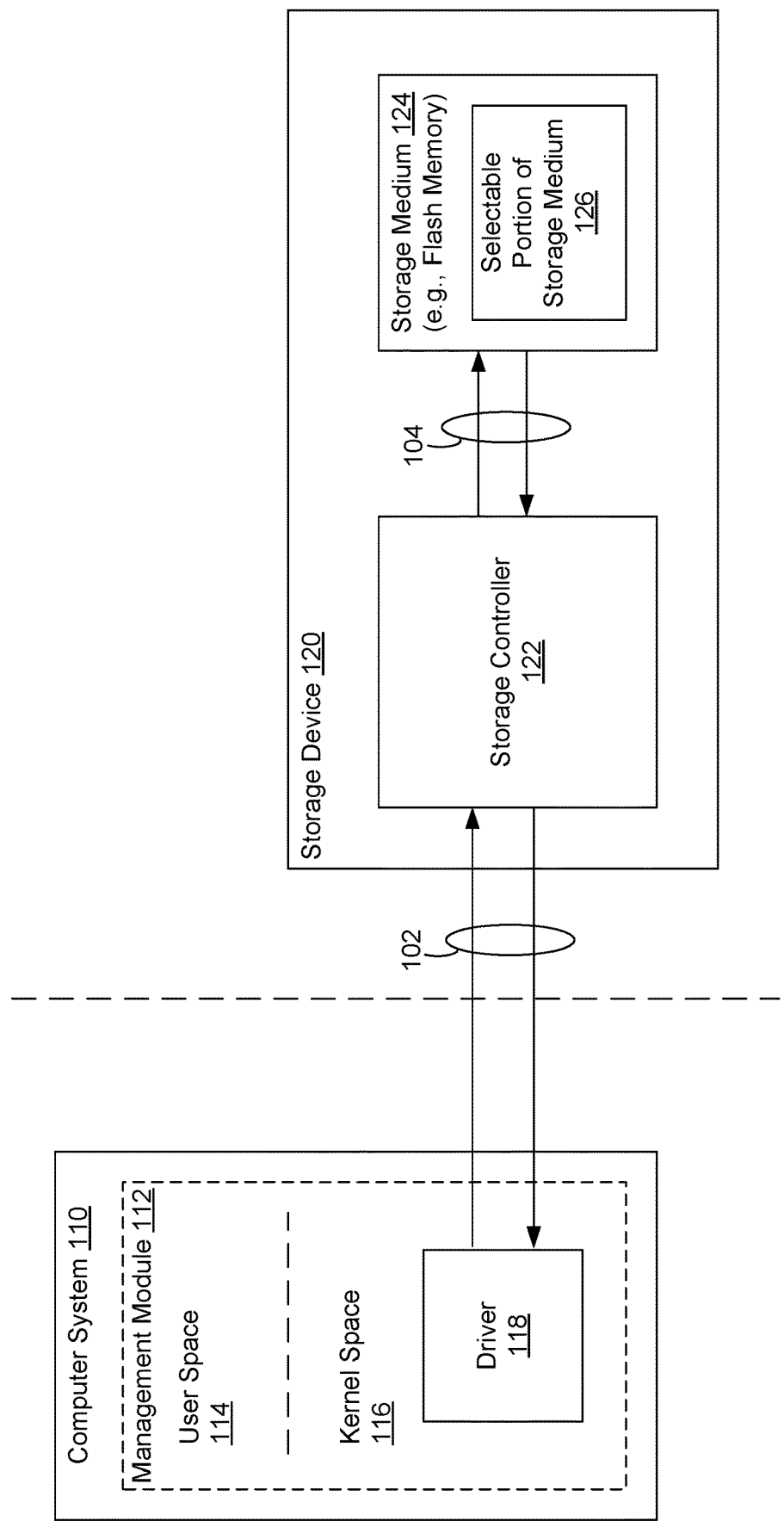
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods and/or devices used to process a physical memory request.

(A1) More specifically, some embodiments include a method for processing a physical memory request, including: sending, by a first user space module, a logical memory request to a kernel space memory management module of a kernel space module, wherein the logical memory request includes data and metadata; obtaining, by a second user space module, the metadata of the logical memory request; determining, by a storage engine of the second user space module, in accordance with the obtained metadata, a location for the data in non-volatile memory of a storage device; generating, by the second user space module, a physical memory request including an indication of the location in the non-volatile memory for the data; and transmitting, by the second user space module, to the kernel space memory management module, the physical memory request.

(A2) In some embodiments of the method of A1, the data is retained by the kernel space memory management module during the sending, obtaining, determining, generating, and transmitting.

(A3) In some embodiments of the method of any of A1-A2, the metadata includes a logical block address of the non-volatile memory.

(A4) In some embodiments of the method of any of A1-A3, the physical memory request is generated by the storage engine, wherein the physical memory request includes a piggybacked request, the piggybacked request including the indication of the location in the non-volatile memory for the data; and the kernel space memory management module processes the piggybacked request of the physical memory request.

(A5) In some embodiments of the method of A4, the kernel space memory management module transmits, to the first user space module, a response to the logical memory request.

(A6) In some embodiments of the method of any of A1-A5, the physical memory request is generated by a formatting module of the second user space module, the physical memory request is transmitted to the kernel space memory management module by the formatting module; and the kernel space memory management module processes the physical memory request.

(A7) In some embodiments of the method of A6, the storage engine transmits, to the first user space module, a response to the logical memory request.

(A8) In some embodiments of the method of any of A1-A7, an intercept interface of the second user space module periodically polls the kernel space memory management module to determine when logical memory requests are available.

(A9) In some embodiments of the method of any of A1-A8, the non-volatile memory comprises one or more three-dimensional (3D) memory devices and circuitry associated with operation of memory elements in the one or more 3D memory devices.

(A10) In some embodiments of the method of A9, the circuitry and one or more memory elements in a respective 3D memory device, of the one or more 3D memory devices, are on the same substrate.

(A11) In another aspect, a computer system includes one or more processors, and memory (e.g., a non-transitory computer readable storage medium) storing one or more programs, which when executed by the one or more processors cause the computer system to perform or control performance of any of the methods A1-A10 described herein.

(A14) In yet another aspect, any of the methods A1-A10 described above are performed by a computer system including means for performing any of the methods described herein.

(A15) In yet another aspect, some embodiments include a non-transitory computer readable storage medium, storing one or more programs configured for execution by one or more processors of a computer system, the one or more programs including instructions for performing any of the methods A1-A10 described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120, which includes a storage controller 122 and a storage medium 124, and is used in conjunction with or includes a computer system 110. In some embodiments, storage medium 124 is a single flash memory device while in other embodiments storage medium 124 includes a plurality of flash memory devices. In some embodiments, storage medium 124 is NAND-type flash memory or NOR-type flash memory. In some embodiments, storage medium 124 includes one or more three-dimensional (3D) memory devices, as further defined herein. Other types of storage media may be included in storage device 120 in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels, or the like. In some embodiments, data storage system 100 can contain one or more storage devices 120.

Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera and/or any number of supplemental devices to add functionality. In some embodiments, computer system 110 does not have a display and other user interface components.

Computer system 110 includes a management module 112. Management module 112 includes a user space module 114 and a kernel space module 116. In some embodiments, kernel space module 116 is a memory area of computer system 110 reserved for running an operating system kernel; drivers such as file system drivers, hardware drivers (e.g., driver 118 for communication with storage device 120), and/or other kernel-mode drivers; and/or other kernel mode components. In some embodiments, user space module 114 is a memory area of computer system 110 reserved for running application software, user-mode drivers, and/or other user mode components.

Computer system 110 is coupled to storage device 120 through data connections 102 (e.g. driver 118 of computer system 110 is coupled to storage controller 122 of storage device 120 through data connections 102). However, in some embodiments computer system 110 includes storage controller 122, or a portion of storage controller 122, as a component and/or a subsystem. For example, in some embodiments, some or all of the functionality of storage controller 122 is implemented by software executed on computer system 110.

Storage medium 124 is coupled to storage controller 122 through connections 104. Connections 104 are sometimes called data connections, but typically convey instructions in addition to data, and optionally convey metadata, error correction information, and/or other information in addition to data values to be stored in storage medium 124 and data values read from storage medium 124. In some embodiments, storage controller 122 and storage medium 124 are included in the same device (i.e., an integral device) as components thereof. Furthermore, in some embodiments, storage controller 122 and storage medium 124 are embedded in a host device (e.g., computer system 110), such as a mobile device, tablet, other computer or computer controlled device, and the methods described herein are performed, at least in part, by the embedded memory controller. Storage medium 124 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

In various embodiments, storage medium 124 includes and/or is included in one or more devices (e.g., computer system 110) remote from storage controller 122.

Storage medium 124 is divided into a number of addressable and individually selectable blocks, such as selectable portion 126. In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

Figure 2:
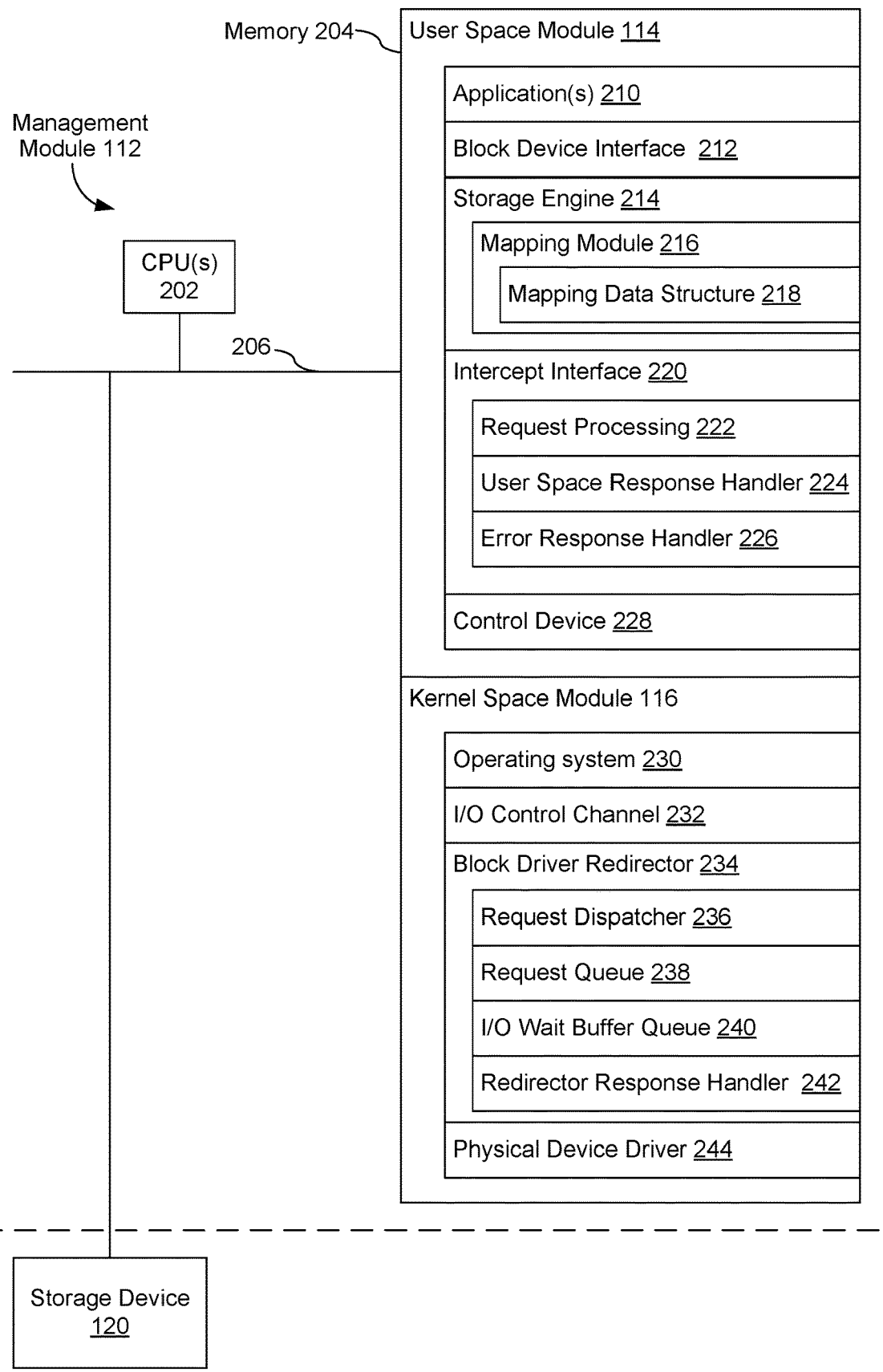
FIG. 2 is a block diagram illustrating an implementation of a management module, in accordance with some embodiments.

FIG. 2 is a block diagram illustrating a management module 112, as shown in FIG. 1, in accordance with some embodiments. Management module 112 typically includes one or more processing units 202, sometimes called central processing units (CPUs), processors, hardware processors, or microprocessors, for executing modules, programs and/or instructions stored in memory 204 and thereby performing processing operations; memory 204 (sometimes called controller memory); and one or more communication buses 206 for interconnecting these components. The one or more communication buses 206 optionally include circuitry (sometimes called a chipset) that interconnects and controls communications between system components. Management module 112 is coupled to storage device 120 by the one or more communication buses 206. Memory 204 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 204 optionally includes one or more storage devices remotely located from the CPU(s) 202. Memory 204, or alternatively the non-volatile memory device(s) within memory 204, comprises a non-transitory computer readable storage medium. In some embodiments, memory 204, or the non-transitory computer readable storage medium of memory 204 stores the following programs, modules, and data structures, or a subset or superset thereof:

User space module 114, including the following components:
  Application(s) 210, for example one or more user applications, such as data processing software, data analysis software, data management software, etc., and/or a file system, which issue memory access requests, for accessing data stored in storage device 120, in the form of block I/O requests;
  Block device interface module 212, which conveys block I/O requests from user space application(s) 210 to kernel space block driver redirector 234, and optionally conveys acknowledgments of such requests from block driver redirector 234 to application(s) 210.
  Storage engine module 214, which includes procedures for managing data storage and managing metadata for data storage (e.g., procedures for determining a physical location in storage device 120 for performing memory operations using mapping information from mapping module 216 and or mapping data structure module 218), such as ZETASCALE™;
  Mapping module 216, which includes procedures for managing a mapping data structure 218;
  Mapping data structure module 218, such as a table, a tiered data structure (e.g., B–Tree, B+Tree, B*Tree, etc.), or other data structure including mappings that map logical addresses (e.g., logical block addresses used by application 210 and/or listed by block device 212) to physical addresses (e.g., physical block addresses of selectable portions 126 of storage device 120);
  Intercept interface module 220, which includes procedures (e.g., a library including an intercept API) for adapting communications (e.g., communications conveying parameters, operation requests, etc.) generated by user space module 114 to be compatible with kernel space module 116 and/or procedures for adapting communications generated by kernel space module 116 to be compatible with user space module 114;
  Request processing module 222, which includes procedures for polling for requests received by redirector module 234 (also called block driver redirector 234) of kernel space module 116;
  User space response handling module 224, which includes procedures for transmitting communications from storage engine 214 to I/O control channel 232.
  Error response handler 226, which includes procedures for communicating error information from storage engine 214 to I/O control channel 232.
  Control device 228, which includes procedures for formatting a write request for sending to redirector module 234 (also called block driver redirector 234) of kernel space module 116; and
Kernel space module 116, including the following components:
  Operating system 230, which includes procedures for handling various basic system services and for performing hardware dependent tasks.
  I/O control channel 232, which is a communication channel via which components of user space module 114 make requests to fetch queued storage operations from block driver redirector 234.
  Block driver redirector 234, which is kernel space module that redirects block I/O requests, received from application(s) 210, to a user space storage engine 214 (for determining physical memory locations to be accessed in storage device 120), and then conveys the resulting physical memory requests to storage device 120 via physical device driver 244.
  Request dispatcher 236, which includes procedures for de-queuing a block I/O request from request queue 238 and preparing a request communication including metadata (e.g., request type, unique request tag, block offset, etc.) for transmission to user space module 114.

Request queue 238, into which block I/O requests are placed by block driver redirector 234.

I/O wait buffer queue 240, which includes data buffers for requests that have been de-queued from request queue 238, but not yet executed. The data buffers in I/O wait buffer queue 240 store I/O request information (such as a buffer containing the write data to be transmitted to storage device 120 and/or an empty buffer to receive data read from storage device 120). When physical addresses or locations within storage device 120 are determined by storage engine 214, data from I/O wait buffer queue 240 is written to storage device 120 in the case of a write request and data read from storage device 120 is placed in I/O wait buffer queue 240 in the case of a read request. In some embodiments, each data buffer in queue 240 is paired with a unique request identifier to identify the block I/O request corresponding to that data buffer.

Redirector response handler 242, which includes procedures for receiving physical memory requests, also herein called storage operation requests (e.g., read, write, erase, etc.), prepared by one or more components of user space module 114 (e.g., storage engine 214, control device 228, etc.); retrieving data for write requests from the data buffers in I/O wait buffer queue 240; executing the physical memory requests; and placing data retrieved for read requests into I/O wait buffer queue 240. For example, in some embodiments, executing a write request includes sending data from the data buffers to storage device 120 via physical device driver 244. In some embodiments, executing a read request includes obtaining data from storage device 120 via physical device driver 244 and inserting the obtained data into I/O wait buffer queue 240 for sending to application(s) 210. In some embodiments, redirector response handler 242 acknowledges the block I/O requests by sending acknowledgment messages or signals to application(s) 210.

Physical device driver 244, which executes physical memory requests by sending corresponding commands (e.g., read, write, erase, unmap, etc.) to storage device 120. In the embodiments described below, the physical memory requests are received from redirector response handler 242.

Figure 3:
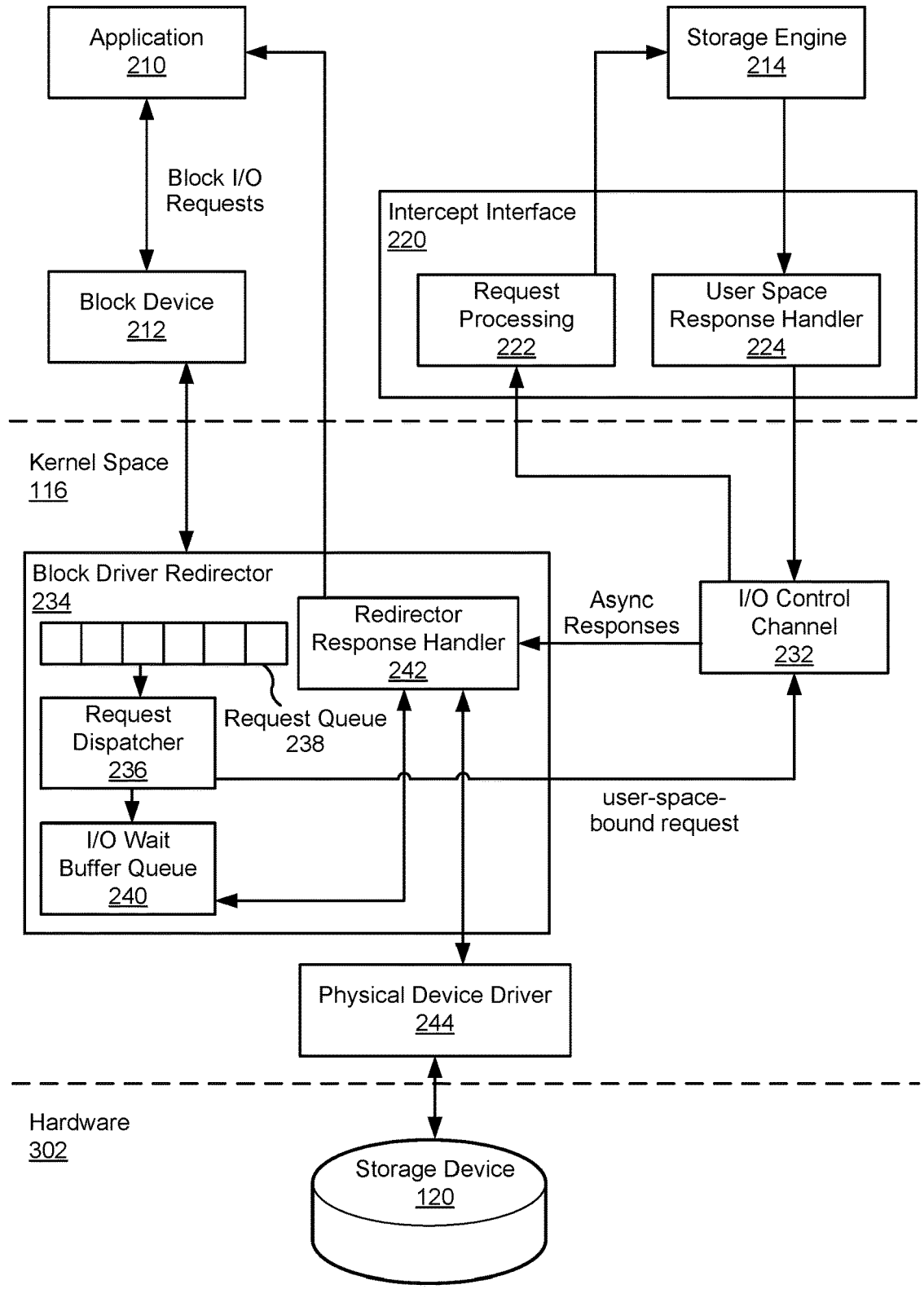
FIGS. 3-4 are block diagrams illustrating memory operation communications between user space, kernel space, and hardware, in accordance with some embodiments.

In some embodiments, application 210 and block device 212 use a block mode of access to access data stored in storage device 120. When a block mode of access is used, virtual addresses specified by memory access commands issued by a user application are conveyed to a file system, and those virtual addresses are translated by the file system into block identifiers, which in turn are translated into physical addresses by storage engine 214. In the context of FIG. 3, both the user application and the file system are part of application 210, while block device 212 is a module or interface for conveying block I/O requests, also herein called logical memory requests, to block driver redirector 234. Application 210 issues logical memory requests, also herein called block I/O requests, for accessing specified portions of one or more specified files or other logical data structures.

Storage engine 214 is a user mode application or module for mapping logical addresses, sometimes called logical block addresses or block identifiers, into physical addresses. Having a user mode storage engine 214 enables storage optimizations, especially for very large scale memory systems, that might be difficult to achieve using a kernel mode storage engine.

The physical addresses generated by the user mode storage engine 214 are physical addresses of memory blocks in memory (e.g., persistent memory, such as flash memory or other non-volatile memory) in storage device 120. Physical device driver 244 executes block mode memory access commands, using those physical addresses, in order to read, write, invalidate and/or erase data in memory in storage device 120, as specified by application 210. The block mode memory access commands executed by physical device driver 244 are sometimes herein called physical memory requests. In some embodiments, block driver redirector 234 and physical device driver 244 are both components of a kernel mode "block driver," which handles access to storage device 120.

In some embodiments, application 210 and block device 212 use a file access mode to access data stored in storage device 120. When a file mode of access is used, file identifiers specified by memory access commands issued by a user application are conveyed to a file system. The file identifiers are translated into physical addresses by storage engine 214.

In some embodiments, application 210 and block device 212 use a key value access mode to access data stored in storage device 120. When a key value access mode of access is used, key values specified by memory access commands issued by a user application are conveyed to a file system. The key values are translated into physical addresses by storage engine 214.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 204 may store a subset of the modules and data structures identified above. Furthermore, memory 204 may store additional modules and data structures not described above. In some embodiments, the programs, modules, and data structures stored in memory 204, or the non-transitory computer readable storage medium of memory 204, provide instructions for implementing some of the methods described below. In some embodiments, some or all of these modules may be implemented with specialized hardware circuits that subsume part or all of the module functionality.

Although FIG. 2 shows management module 112 in accordance with some embodiments, FIG. 2 is intended more as a functional description of the various features which may be present in management module 112 than as a structural schematic of the embodiments described herein. In practice, and as recognized by those of ordinary skill in the art, the programs, modules, and data structures shown separately could be combined and some programs, modules, and data structures could be separated.

FIG. 3 is a block diagram illustrating memory operation communications between user space, kernel space, and hardware, in accordance with some embodiments. In FIG. 3, communications generated by storage engine 214 are transmitted to block driver redirector 234 via I/O control channel 232.

An application 210 issues a logical memory request (e.g., a "block I/O request" to read data, write data, erase data, invalidate data, etc.). The logical memory request is transmitted to kernel space module 116 via block device interface 212.

Block driver redirector 234 of kernel space module 116 receives the logical memory request and places the request into request queue 238. In some embodiments, intercept interface 220 continuously (e.g., periodically) polls block driver redirector 234 for received requests. When a block I/O request (logical memory request) is received, request dispatcher 236 prepares a user-space-bound request that includes information for the block I/O request, but which excludes any application data or user-data for the block I/O request. The user-space-bound request includes metadata for the block I/O request, such as the type of request (e.g., read, write, erase, unmap, etc.), a unique request identifier (e.g., a value enabling the logical memory request to be found in request queue 238 or I/O wait buffer queue 240), block offset, etc. In some embodiments, or in some circumstances, the block offset in the user-space-bound request is a relative address, indicating an offset from the beginning of a file or other data structure.

In conjunction with conveying the user-space-bound request to storage engine 214 via I/O control channel 232 and intercept interface 220, request dispatcher 236 moves the write data, if any, from the corresponding block I/O request (logical memory request) in request queue 238 to a data buffer in I/O wait buffer queue 240. In some embodiments, each data buffer in I/O wait buffer queue 240 is paired with a unique request identifier to identify the block I/O request corresponding to that data buffer. In addition, request dispatcher 236 removes (or de-queues) the corresponding logical memory request from request queue 238.

Request dispatcher 236 transmits the user-space-bound request via I/O control channel 232 to intercept interface 220 of user space module 114. In some embodiments, or in some circumstances, request dispatcher 236 batches multiple user-space-bound requests together prior to transmitting the user-space-bound request.

Intercept interface 220 forwards the received user-space-bound request to storage engine 214. Using the information in the user-space-bound request, storage engine 214 determines a location in storage device 120 for the data of the block I/O request from which the user-space-bound request was generated. For example, storage engine 214 consults mapping module 216 (e.g., mapping data structure 218) to determine a physical memory location for the block I/O request.

In an illustrative example, a block I/O request (logical memory request) is a write request. The storage engine uses a mapping data structure 218 and metadata from the logical memory request indicating a size of the data to be written to storage device 120 to determine a physical memory location in storage device 120 at which the data is to be written.

Storage engine 214 returns physical memory location information for the user-space-bound request to intercept interface 220. The physical memory location information identifies physical memory locations to be accessed in storage device 120. Intercept interface 220 prepares a kernel-space-bound response using (e.g., that includes) the physical memory location information. The kernel-space-bound response includes information such as the type of request or type of memory operation to be performed (e.g., read, write, erase, unmap, etc.), unique request identifier, physical memory location, data size, etc. In some embodiments, the kernel-space-bound response includes a piggybacked physical memory request that includes the information such as the type of request (e.g., read, write, erase, etc.), unique request identifier, physical memory location, data size, etc. User space response handler 224 transmits the kernel-space-bound response from intercept interface 220 to block driver redirector 234 via I/O control channel 232.

Block driver redirector 234 receives the kernel-space-bound response, including the piggybacked physical memory request. In some embodiments, block driver redirector 234 checks for the piggybacked request and extracts the piggybacked request from the kernel-space-bound response. Redirector response handler 242 handles the physical memory request by using physical device driver 244 to carry out the operation indicated by the physical memory request with data stored in I/O wait buffer queue 240. Typically, after the physical memory request has been carried out, block driver redirector 234 transmits an acknowledgment of the block I/O request (logical memory request) to application 210 via block device 212.

Figure 4:
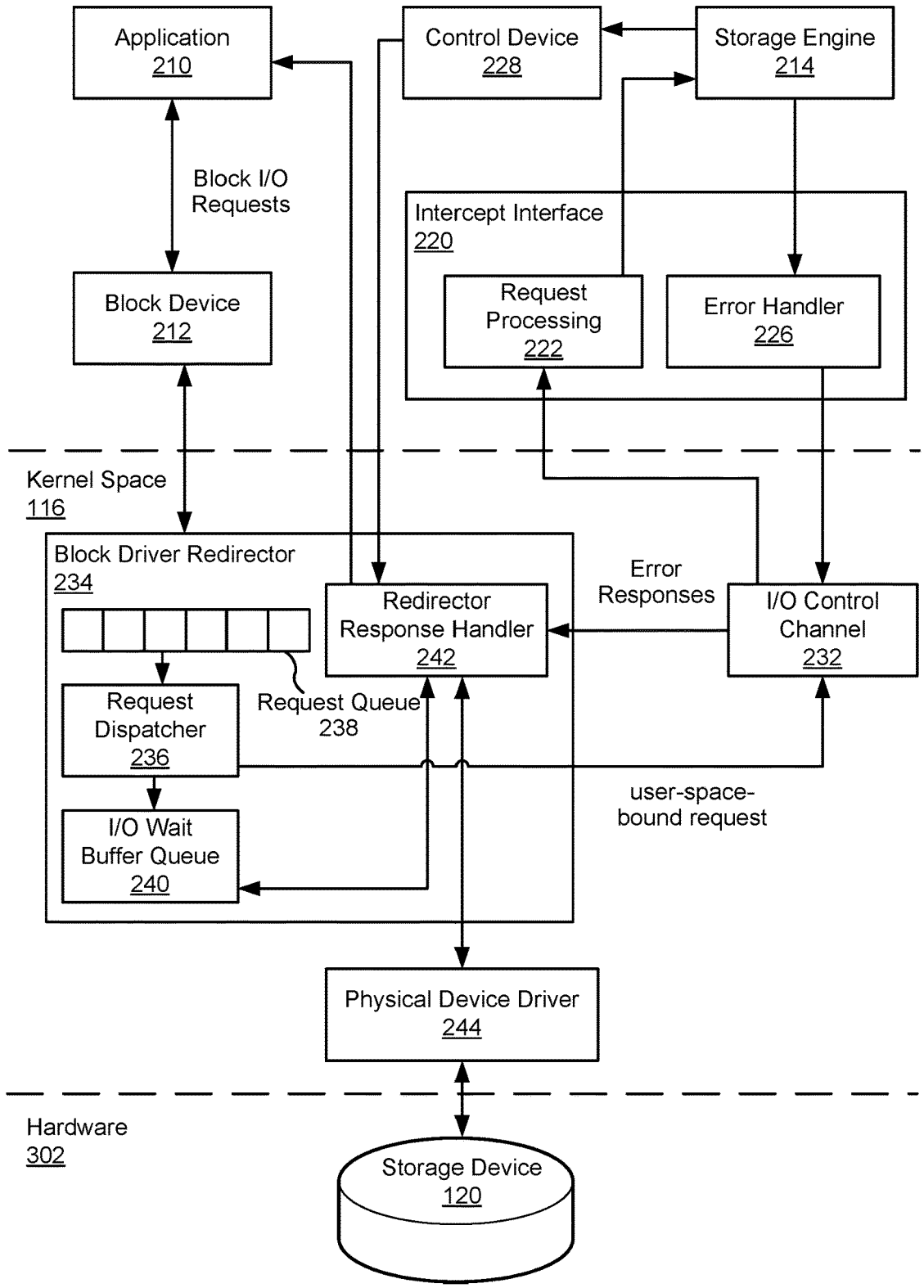

FIG. 4 is a block diagram illustrating memory operation communications between user space, kernel space, and hardware of a computer system (e.g., computer system 110, FIG. 1), in accordance with some embodiments. Except as described below, the operation of the system shown in FIG. 4 is the same as the operation of the system shown in FIG. 3. A primary difference between the system shown in FIG. 4 and the system shown in FIG. 3 is that, in FIG. 4, memory operation communications generated by storage engine 214 are transmitted to block driver redirector 234 via control device 228.

More particularly, in some embodiments, in response to the user-space bound request, storage engine 214 transmits to control device 228 (in user space module 114) a physical memory request including physical memory location information specifying a location in storage device 120 to be accessed by the physical memory request. In some embodiments, the physical memory request includes the type of request or type of memory operation to be performed (e.g., read, write, erase, unmap, etc.), a unique request identifier and a physical memory location (e.g., block offset), etc. Control device 228 transmits a kernel-space-bound response, including the physical memory request, to block driver redirector 234.

In some embodiments, if storage engine 214 determines that an error communication is needed, storage engine 214 transmits the error communication to intercept interface 220. User space response handler 224 transmits the error communication from intercept interface 220 to block driver redirector 234 via I/O control channel 232.

Block driver redirector 234 receives from control device 228 the kernel-space-bound response, including the physical memory request. Redirector response handler 242 handles the physical memory request by using physical device driver 244 to carry out the operation indicated by the physical memory request, by accessing a physical storage location in storage device 120. When the physical memory request is a write request, redirector response handler 242 handles the physical memory request by using physical device driver 244 to write data stored in I/O wait buffer queue 240 to the physical memory location in storage device 120 specified by the physical memory request. Furthermore, once the physical memory request has been executed, block driver redirector 234 typically transmits acknowledgment of the corresponding block I/O request (logical memory request) to application 210 via block device 212.

Various user space storage engines (i.e., storage engines not represented in FIGS. 3 and 4) are implemented such that data of I/O operations (e.g., data to be stored in a physical memory device, such as storage device 120) is copied from an application in user space to a virtual file system in kernel space, after which the data is copied from kernel space to the user space storage engine (which determines where in physical memory to store the data), and the data is subsequently copied from user space to kernel space, where a kernel space driver handles the I/O operation with a physical memory device.

In contrast, in the embodiments described herein, when the user-space-bound request corresponding to a block I/O request (logical memory request) is transmitted from kernel space 116 to storage engine 214 in user space module 114, no application data or user data is transmitted from kernel space 116 to storage engine 214 in user space module 114. Instead, the user-space-bound request includes information sufficient to identify where the data for the logical memory requests is being buffered in block driver redirector 234. Similarly, in the embodiments described herein, when a physical memory request is transmitted by storage engine 214 to kernel space block driver redirector 234, no application data or user data is transmitted from user space module 114 to kernel space 116. Instead, the user-space-bound physical memory request includes information sufficient to identify where the data for the logical memory requests is being buffered in block driver redirector 234 (e.g., in I/O wait buffer queue 240). In this way, the amount of data copied between user space module 114 and kernel space 116 in conjunction with the execution of a block I/O request is reduced.

Additionally, in contrast with alternative user space file systems that would implement a storage engine in kernel space, the embodiments described herein result in less impact on the kernel (e.g., less kernel space consumed, reduced interaction with kernel components, etc.).

Figure 5A:
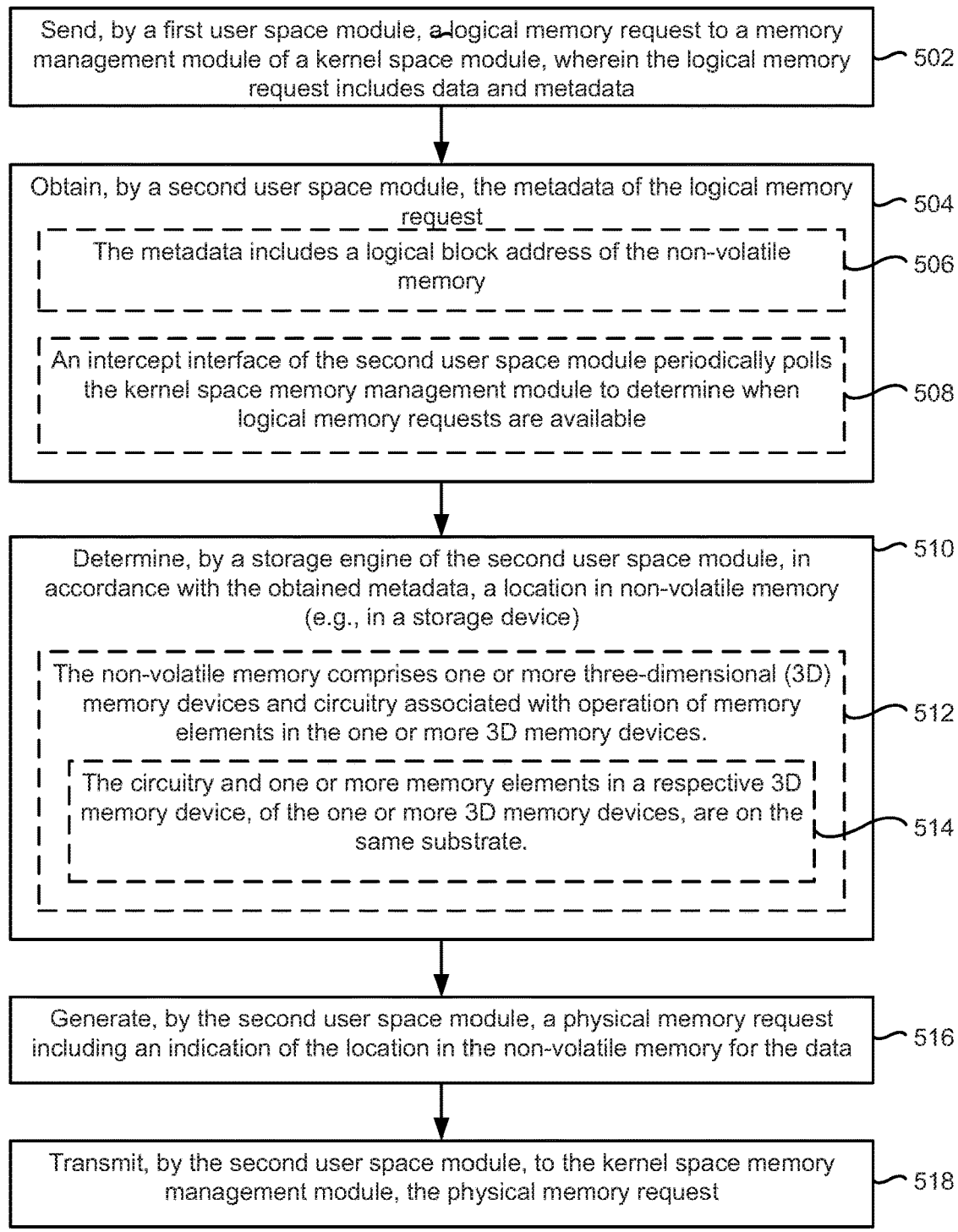
FIGS. 5A-5B illustrate a flowchart representation of a method for processing a memory request, in accordance with some embodiments.
Figure 5B:
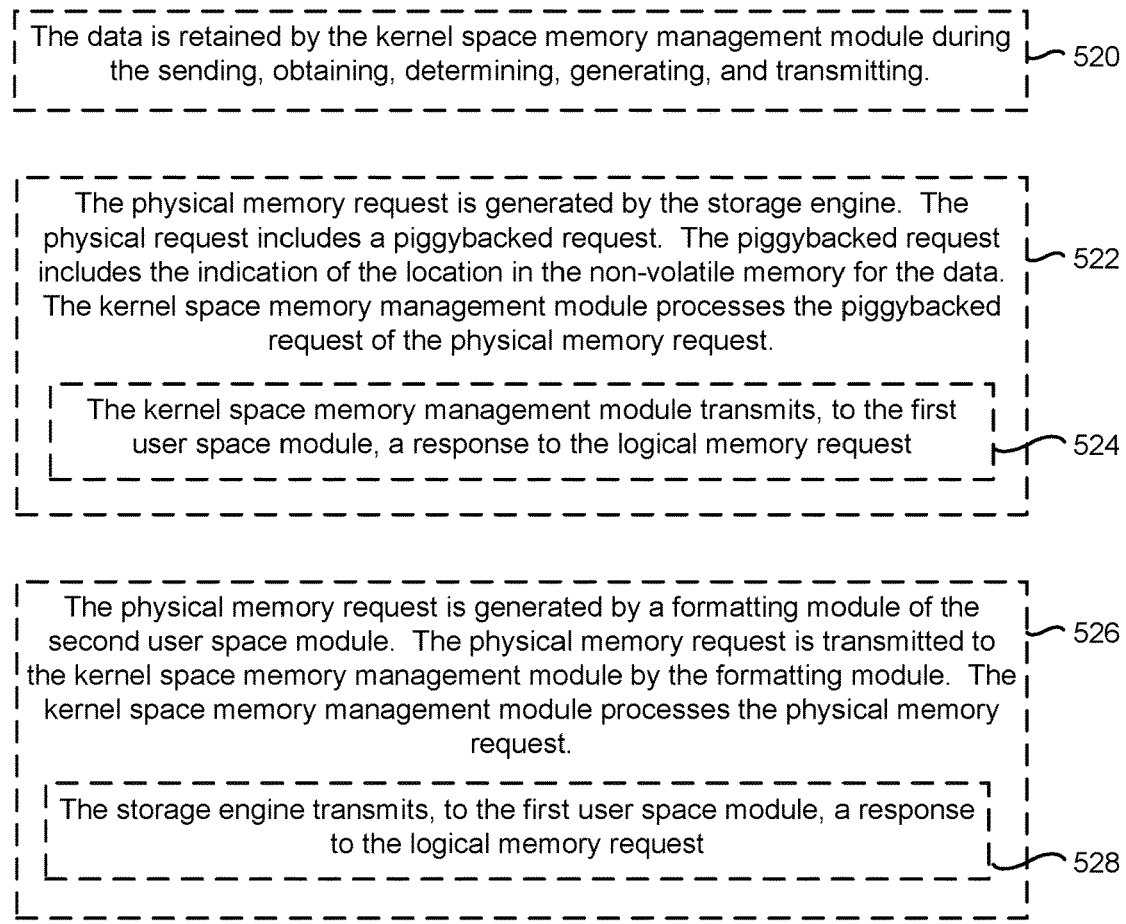

FIGS. 5A-5B illustrate a flowchart representation of a method 500 for processing a memory request, in accordance with some embodiments. In some embodiments, method 500 is performed by a computer system, such as computer system 110, shown in FIG. 1, coupled to a storage device (e.g., storage device 120, FIG. 1) having non-volatile memory (e.g., storage medium 124, FIG. 1). In some embodiments, method 500 is performed by a management module of a computer system (e.g., management module 112, FIGS. 1 and 2, of computer system 110).

In some embodiments, the method 500 includes sending (502), by a first user space module (e.g., application 210), which is a sub-module of user space module 114, a logical memory request to a memory management module (e.g., block driver redirector 234) of a kernel space module 116, wherein the logical memory request (sometimes herein called a block I/O request) includes data and metadata. In some embodiments, application 210 has a logical perspective as to where data is stored and/or to be stored in non-volatile memory (e.g., selectable portions of storage device 120). The logical memory request includes metadata, e.g., request type (read, write, erase, or unmap), block offset or block identifier, data size (e.g., a parameter indicating the amount of data to be read, written, erased or unmapped), etc. In some embodiments or in some circumstances (e.g., when the logical memory request is a write request), the logical memory request includes data to be written to storage device 120.

In some embodiments, the method includes obtaining (504), by a second user space module, which is a sub-module of user space module 114, the metadata of the logical memory request. In some embodiments, the second user space module is one or more modules such as intercept interface 220, storage engine 214, control device 228, etc.

In some embodiments, the metadata includes (506) a logical block address to be accessed during execution of the logical memory request. In some embodiments, the metadata includes additional information such as unique request identification, type of request (read, write, erase, unmap, etc.), and/or data size.

In some embodiments, intercept interface 220 of the second user space module periodically polls (508) the kernel space memory management module (e.g., redirector response handler 242 of block driver redirector 234) to determine when logical memory requests are available (e.g., in request queue 238).

In some embodiments, the method includes determining (510), by a storage engine 214 of the second user space module, in accordance with the obtained metadata, a location in the non-volatile memory (e.g., storage device 120) for the data. For example, storage engine 214 of second module uses mapping module 216 and/or mapping data structure module 218 to determine a location in physical memory (e.g., storage device 120) for the data indicated by the obtained metadata.

In some embodiments, the non-volatile memory comprises (512) one or more three-dimensional (3D) memory devices and circuitry associated with operation of memory elements in the one or more 3D memory devices. In some embodiments, the circuitry and one or more memory elements in a respective 3D memory device, of the one or more 3D memory devices, are on (514) the same substrate.

In some embodiments, the method includes generating (516), by the second user space module, a physical memory request including an indication of the physical location in non-volatile memory to be accessed by the physical memory request. In some embodiments, the physical memory request is generated by storage engine 214 and/or control device 228.

In some embodiments, the method includes transmitting (518), by the second user space module (e.g., by storage engine 214 and/or control device 228), to the kernel space memory management module (e.g., block driver redirector 234), the physical memory request. In some embodiments, the block driver redirector 234 uses the physical memory request to direct (e.g., using redirector response handler 242) physical device driver 244 to write the data of the logical memory request (e.g., data stored in I/O wait buffer queue 240 for the logical memory request) to storage device 120. In some embodiments, user space module 114 generates and transmits the aforementioned metadata to block driver redirector 234 (i.e., rather than generating and transmitting a physical memory request).

In some embodiments, the data for the logical memory request is retained (520) by the kernel space memory management module (i.e., the data is not copied from kernel space module 116 to user space module 114) during the sending, obtaining, determining, generating, and transmitting described above with regard to operations 502, 504, 510, 516, and 518. In some embodiments, the data is not copied from kernel space module 116 to user space module 114 in conjunction with the second user space module (e.g., intercept interface 220) obtaining the metadata of the logical memory request, the data is not copied from user space module 114 to kernel space module 116 in conjunction with transmitting the physical memory request from user space module 114 to kernel space module 116, and the data is also not copied from kernel space module 116 to user space module 114 in conjunction with sending a response to the logical memory request, (e.g., a response from block driver redirector 234 to application 210), etc. In some embodiments, during processing of the logical memory request, the data is retained in a queue (e.g., a queue of pending requests, such as request queue 238, or a queue for hold the data for pending requests, such as I/O wait buffer queue 240) by the kernel space memory management module (e.g., block driver redirector 234).

In some embodiments, the physical memory request is generated (522) by the storage engine 214 and the physical memory request includes a piggybacked request that includes the indication of the location in the non-volatile memory for the data. In some embodiments, the kernel space memory management module (e.g., redirector response handler 242 of block driver redirector 234) processes (522) the piggybacked request of the physical memory request. In some embodiments, block driver redirector 234 is configured to check for a piggybacked request when processing a memory communication (e.g., a kernel-space-bound response) received from intercept interface 220. The kernel space memory management module (e.g., redirector response handler 242 of block driver redirector 234) processes the piggybacked request by accessing the physical memory location, indicated by the physical memory request, in non-volatile memory (e.g., in storage device 120) so as to read, write, erase or unmap data at that physical memory location.

In some embodiments, the kernel space memory management module (e.g., block driver redirector 234) transmits (524), to the first user space module (e.g., application 210), a response to the logical memory request (e.g., transmits the response subsequent to processing the physical memory request). For example, the response to the logical memory request includes an indication that the logical memory request was performed.

In some embodiments, the physical memory request is generated by a formatting module (e.g., control device 228) of the second user space module (526). The physical memory request is transmitted (526) to the kernel space memory management module (e.g., redirector response handler 242 of block driver redirector 234) by the formatting module. The kernel space memory management module (e.g., redirector response handler 242 of block driver redirector 234) processes (526) the physical memory request.

In some embodiments, storage engine 214 transmits (528), to the first user space module, (e.g. via the intercept interface 220 and the block driver redirector 234), a response to the logical memory request. Alternatively, in some embodiments, the kernel space memory management module (e.g., redirector response handler 242 of block driver redirector 234) transmits to the first user space module a response to the logical memory request. For example, the response to the logical memory request includes an indication that the logical memory request was performed.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The semiconductor memory elements located within and/or over a substrate may be arranged in two or three dimensions, such as a two dimensional memory structure or a three dimensional memory structure.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array; or two or more 2D and/or 3D memory devices, packaged together to form a stacked-chip memory device.

One of skill in the art will recognize that this invention is not limited to the two dimensional and three dimensional structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first storage device could be termed a second storage device, and, similarly, a second storage device could be termed a first storage device, without changing the meaning of the description, so long as all occurrences of the "first storage device" are renamed consistently and all occurrences of the "second storage device" are renamed consistently. The first storage device and the second storage device are both storage devices, but they are not the same storage device.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for processing a physical memory request on a computer comprising a memory divided into a kernel space and a user space, the method comprising:
   sending, by a first user space module implemented in the user space, a logical memory request to a kernel space memory management module of a kernel space module, implemented in the kernel space, wherein the logical memory request includes data and metadata;
   obtaining, by a second user space module implemented in the user space, the metadata of the logical memory request;
   determining, by a storage engine of the second user space module, in accordance with the obtained metadata, a location for the data in non-volatile memory of a storage device;
   generating, by the second user space module, a physical memory request including an indication of the location in the non-volatile memory for the data; and
   transmitting, by the second user space module, to the kernel space memory management module, the physical memory request.

2. The method of claim 1, wherein the data is retained by the kernel space memory management module during the sending, obtaining, determining, generating, and transmitting.

3. The method of claim 1, wherein the metadata includes a logical block address of the non-volatile memory.

4. The method of claim 1, wherein:
   the physical memory request is generated by the storage engine of the second user space module, wherein the physical memory request includes a piggybacked request, the piggybacked request including the indication of the location in the non-volatile memory for the data; and
   the kernel space memory management module processes the piggybacked request of the physical memory request.

5. The method of claim 4, wherein the kernel space memory management module transmits, to the first user space module, a response to the logical memory request.

6. The method of claim 1, wherein:
   the physical memory request is generated by a formatting module of the second user space module;
   the physical memory request is transmitted to the kernel space memory management module by the formatting module; and
   the kernel space memory management module processes the physical memory request.

7. The method of claim 6, wherein the storage engine transmits, to the first user space module, a response to the logical memory request.

8. The method of claim 1, wherein an intercept interface of the second user space module periodically polls the kernel space memory management module to determine when logical memory requests are available.

9. A computer system, comprising:
   one or more processors; and
   memory divided into a kernel space and a user space, the memory storing one or more programs, which when executed by the one or more processors cause the computer system to:
   send, by a first user space module implemented in the user space, a logical memory request to a kernel space memory management module of a kernel space module implemented in the kernel space, wherein the logical memory request includes data and metadata;
   obtain, by a second user space module implemented in the user space, the metadata of the logical memory request;
   determine, by a storage engine of the second user space module, in accordance with the obtained metadata, a location for the data in non-volatile memory of a storage device;
   generate, by the second user space module, a physical memory request including an indication of the location in the non-volatile memory for the data; and
   transmit, by the second user space module, to the kernel space memory management module, the physical memory request.

10. The computer system of claim 9, wherein the one or more programs include a block driver redirector, comprising the kernel space module that redirects logical memory requests, received from the first user space module, to the storage engine of the second user space module for determining physical memory locations in accordance with the logical memory requests.

11. The computer system of claim 10, wherein the one or more programs include a physical device driver, and the block driver redirector is further for conveying resulting physical memory requests received from the storage engine of the second user space module to said non-volatile memory via the physical device driver.

12. The computer system of claim 9, wherein the data is retained by the kernel space memory management module during the sending, obtaining, determining, generating, and transmitting.

13. The computer system of claim 9, wherein the metadata includes a logical block address of the non-volatile memory.

14. The computer system of claim 9, wherein:
   the physical memory request is generated by the storage engine of the second user space module, wherein the physical memory request includes a piggybacked request, the piggybacked request including the indication of the location in the non-volatile memory for the data; and
   the kernel space memory management module processes the piggybacked request of the physical memory request.

15. The computer system of claim 14, wherein the kernel space memory management module transmits, to the first user space module, a response to the logical memory request.

16. The computer system of claim 9, wherein:
   the physical memory request is generated by a formatting module of the second user space module;
   the physical memory request is transmitted to the kernel space memory management module by the formatting module; and
   the kernel space memory management module processes the physical memory request.

17. The computer system of claim 16, wherein the storage engine transmits, to the first user space module, a response to the logical memory request.

18. The computer system of claim 9, wherein an intercept interface of the second user space module periodically polls the kernel space memory management module to determine when logical memory requests are available.

19. A non-transitory computer readable storage medium, storing one or more programs configured for execution by one or more processors of a computer system comprising a memory divided into a kernel space and a user space, the one or more programs including instructions that when executed by the one or more processors of the computer system, cause the computer system to:

send, by a first user space module implemented in the user space, a logical memory request to a kernel space memory management module of a kernel space module, implemented in the kernel space, wherein the logical memory request includes data and metadata;

obtain, by a second user space module, the metadata of the logical memory request;

determine, by a storage engine of the second user space module implemented in the user space, in accordance with the obtained metadata, a location for the data in non-volatile memory of a storage device;

generate, by the second user space module, a physical memory request including an indication of the location in the non-volatile memory for the data; and transmit, by the second user space module, to the kernel space memory management module, the physical memory request.

20. The non-transitory computer readable storage medium of claim 19, wherein the data is retained by the kernel space memory management module during the sending, obtaining, determining, generating, and transmitting.

* * * * *